Figure 1:
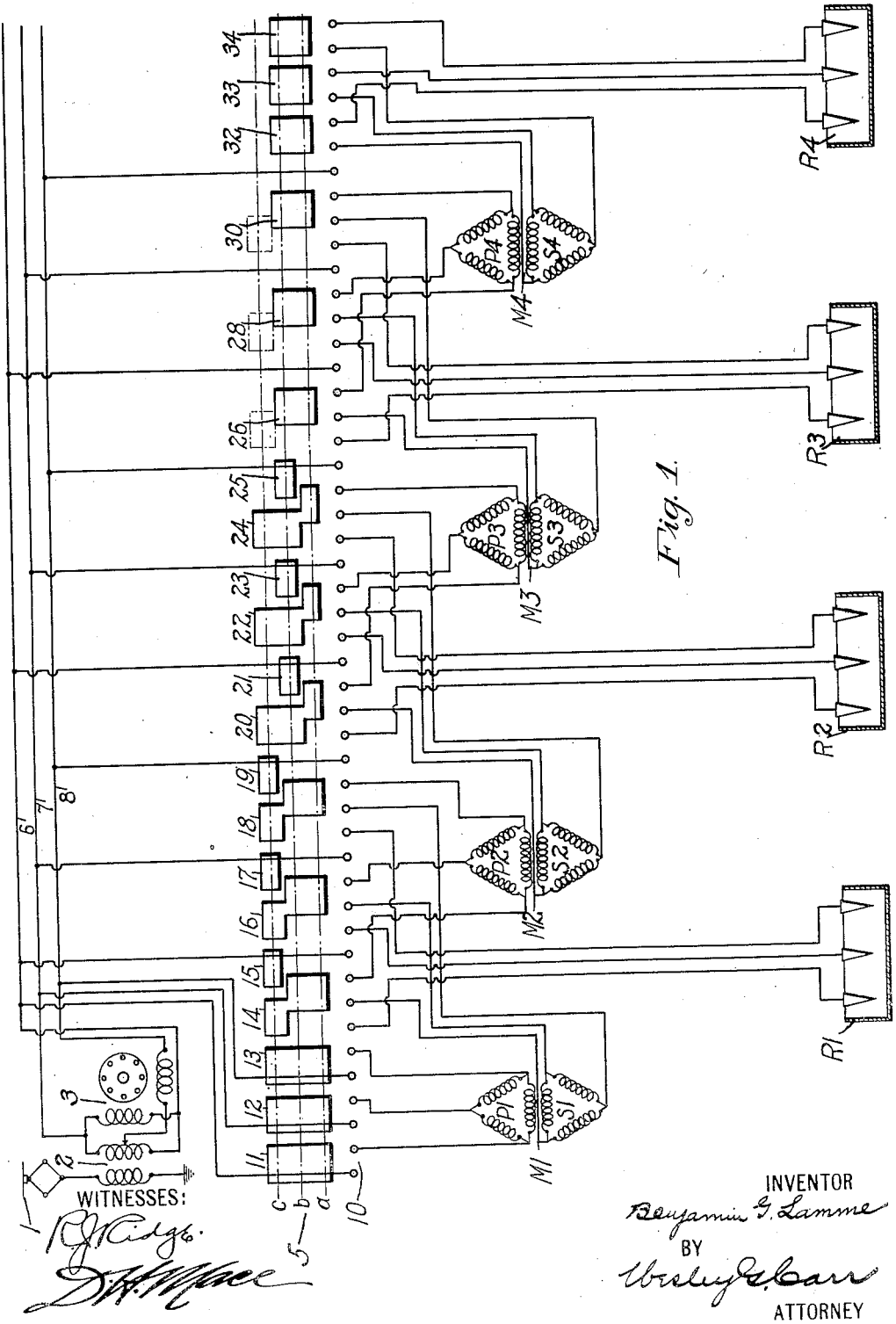

B. G. LAMME.
CONTROL SYSTEM.
APPLICATION FILED FEB. 25, 1914.

1,241,523.

Patented Oct. 2, 1917.
3 SHEETS—SHEET 3.

WITNESSES:

INVENTOR
Benjamin G. Lamme
BY
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,241,523.  Specification of Letters Patent.  Patented Oct. 2, 1917.

Application filed February 25, 1914. Serial No. 820,817.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Control Systems, of which the following is a specification.

My invention relates to control systems for electric motors, and it has special reference to such systems as are adapted to control the operation of electric locomotives or other vehicles which are provided with a plurality of polyphase alternating current motors receiving energy through a phase converter from a single phase source.

One object of my invention is to provide a relatively simple system of control of the class above indicated which is adapted to connect the driving motors to operate efficiently at a plurality of running speeds, as is desirable for certain classes of locomotive service, and particularly to provide such a system which shall be so arranged that the combined efficiency of the phase converter and the driving motors shall be substantially equivalent for the two higher ranges of operating speeds and, moreover, shall be relatively high under full load conditions for both speed ranges by reason of the fact that the machines are worked at substantially their full load capacities and hence at high power factors in both instances.

Another object of my invention is to provide a motor control system for arranging the connections of a plurality of motors for three operating speeds, the motors being adapted, in the lower speed connections, to give substantially equal torque, and, in the two higher speed connections, substantially equal horse-power outputs.

Another object of my invention is to provide motor-controlling means for connecting the motors of a locomotive or vehicle to meet the service requirements with respect to operating speeds and to operate efficiently at relatively high power factors under full load conditions for each operating speed.

A further object of my invention is to provide a control system for a plurality of driving motors supplied with energy from a phase-converter, and to make provision for connecting the motors for different economical operating speeds, and, at the same time, permitting the employment of a relatively small capacity phase-converter which shall normally operate efficiently at substantially its full load rating.

More specifically, an object of my invention is to provide a system involving a relatively small-capacity phase-converter and a plurality of motors of the polyphase type having interconnected windings adapted to be connected for different numbers of poles, and to provide switching means for arranging the motor windings and connections for obtaining low, intermediate and high speed operation, whereby the full loads upon the phase converter and motors for the two highest speed connections are substantially equal.

According to my invention, I propose to accomplish the above-mentioned objects, as well as others of more or less specific character which will hereinafter appear as my invention is described.

Before attempting to set forth my invention, it is deemed advisable to briefly consider the requirements of service upon motor-propelled vehicles of the class in question.

In general, for locomotive work it is desirable to provide at least three operating speeds covering a total speed range from one to four. Such a speed range is particularly essential for locomotives which are intended for both freight and passenger service. The lowest speed is adapted for switching and economical starting of heavy trains, the intermediate speed is adapted for normal operation, particularly for freight service, while the highest speed meets the special requirement of passenger or express service where the trains are comparatively light.

The normal or average torque conditions are required for the intermediate operating speed, while the lower speed should be adapted to deliver substantially the same torque for considerable periods during the acceleration of the load and, perhaps, to deliver a torque materially in excess of the normal torque during the initial starting period. It is, therefore, desirable that, at low and intermediate speeds, the motors shall operate under practically equivalent torque conditions. However, with light loads and the high-speed operating conditions, the requirement is for a horse-power output substantially equal to that of the intermediate speed, in which case the torque is about half of that at the intermediate speed. Moreover, the requirement for constant horse-power output at the high and intermediate speeds meets the conditions imposed by the employment of a phase converter which shall be as small as possible in order to reduce expense, weight and space and which shall be operated efficiently at substantially full load capacity during the two high ranges of operating speeds.

Figure 2:
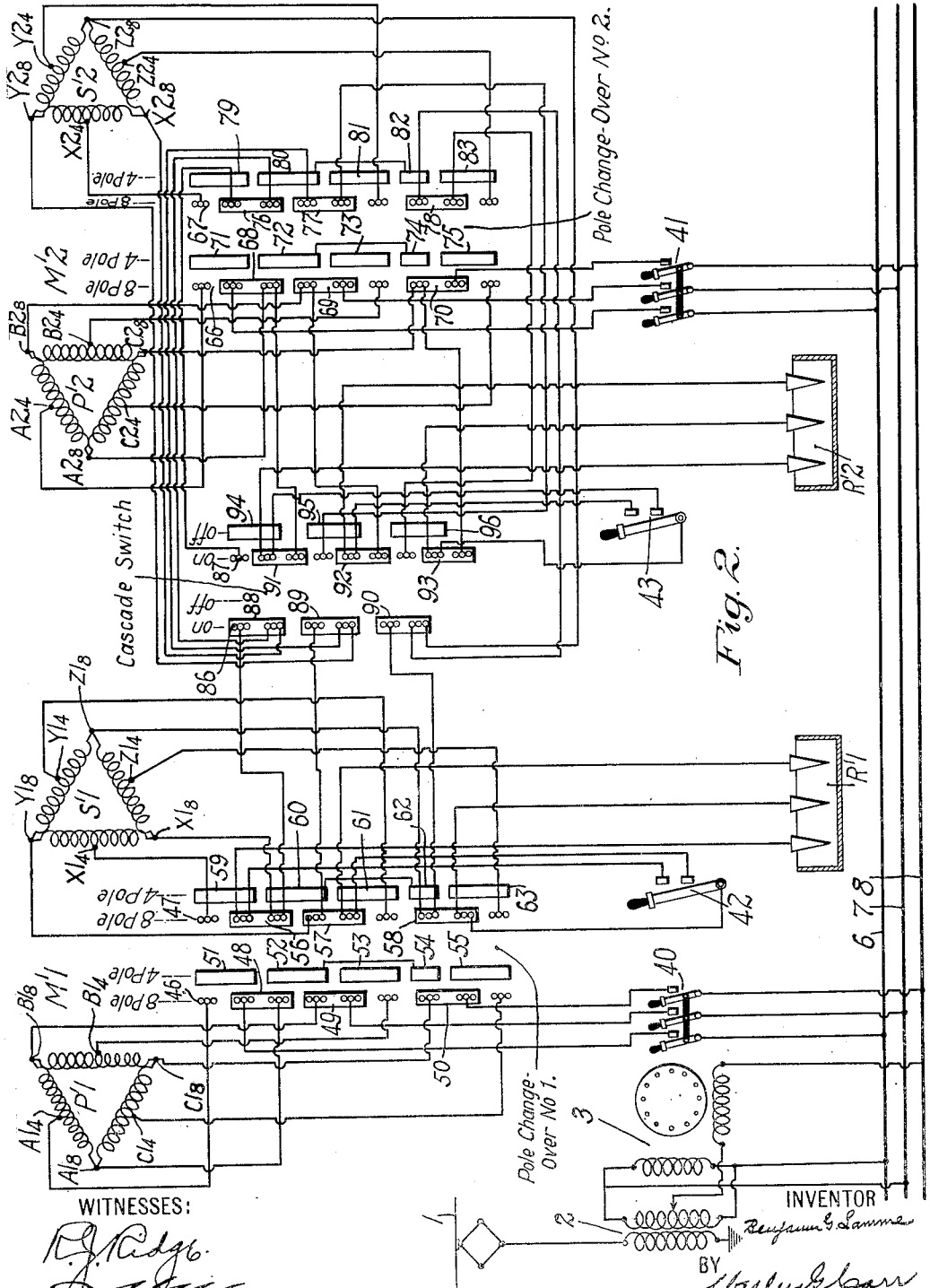
Figure 3:
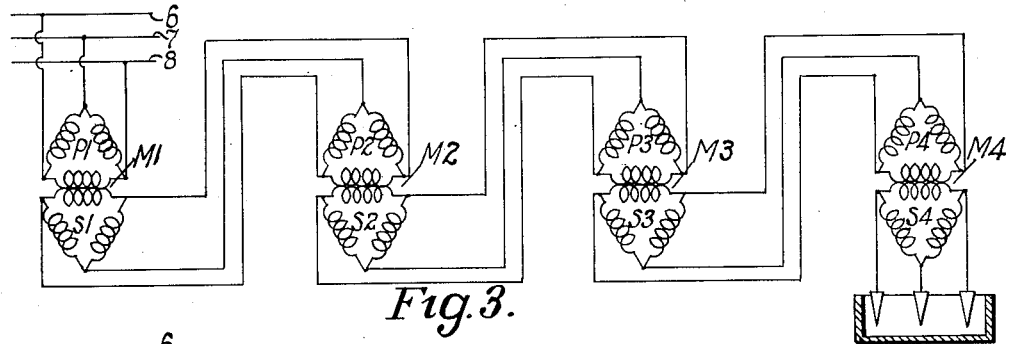
Figure 4:
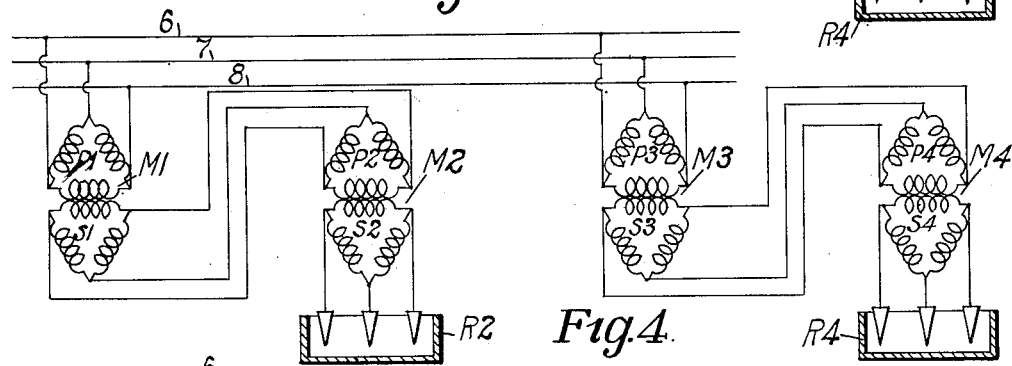
Figure 5:
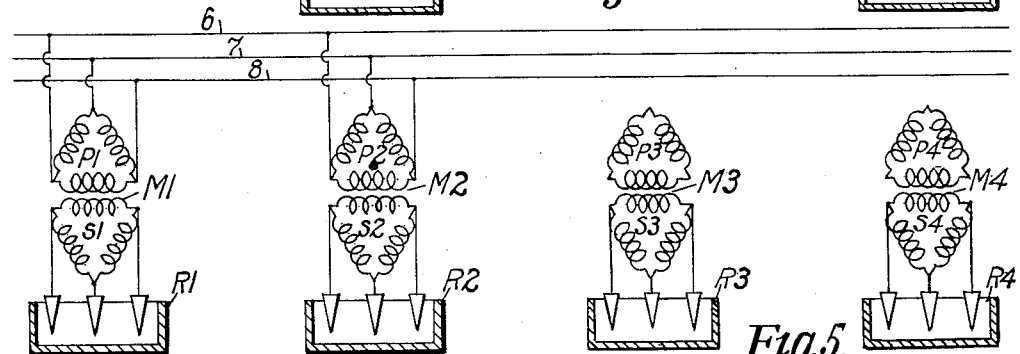

My invention may best be understood by reference to the accompanying drawings, in which Figure 1 is a diagrammatic view of a system of control embodying my invention, Fig. 2 is a similar view of a modified and preferable form of my invention, Figs. 3, 4 and 5 are simplified diagrams of the several main motor connections effected for the different operating speeds secured by the system shown in Fig. 1, and Figs. 6, 7 and 8 are similar diagrams of motor connections for the speeds effected by the system shown in Fig. 2.

Referring to Figs. 1, 3, 4 and 5, the system shown comprises a supply circuit 1, a transformer 2, a phase converter 3, a plurality of dynamo-electric machines M1, M2, M3 and M4, a plurality of liquid rheostats R1, R2, R3 and R4, and a switching device 5 for arranging the circuit connections of the dynamo-electric machines and rheostats.

The supply conductor 1 may be a trolley conductor and be adapted to deliver single-phase alternating current energy to a transformer 2 to which a phase converter 3 is connected in such manner as to supply three-phase alternating current energy to conductors 6, 7 and 8. The converter 3 may be of any suitable construction, although I prefer to employ a converter similar to that described in detail in my co-pending application, Serial No. 808,714, filed December 26, 1913.

Inasmuch as the phase converter 3 pertains only indirectly to my present invention, and as its construction and operation are not material to it, I shall not attempt to describe it further.

The several motors M1, M2, M3 and M4 are of like construction and each preferably constitutes a three-phase induction motor having delta connected windings, although the particular arrangement of windings is not essential. The several motors M1, M2, M3 and M4 are provided, respectively, with primary windings P1, P2, P3 and P4 and with secondary windings S1, S2, S3 and S4 which are wound for the same number of poles, for instance, four poles.

The liquid rheostats R1, R2, R3 and R4 form no material parts of my present invention, except as they perform the function of eliminating resistance from the secondary circuits of the motors during the accelerating periods, and, hence, may be of any suitable construction. Moreover, any type of adjustable rheostats may be employed.

The switching device 5 comprises a set 10 of stationary contact terminals which are adapted to engage a plurality of movable contact segments 11 to 34, inclusive, upon the position-indicating lines $a$, $b$ and $c$, for the purpose of connecting the motors for three operating speeds. The specific structure and arrangement of contact segments and terminals shown is only illustrative of suitable means for accomplishing a desired end, and other types of switching devices adapted to effect the desired circuit connections may be employed. A plurality of electrically controlled unit switches may also be used.

As the controller 5 is moved through its several positions $a$, $b$, and $c$, all of the motors are first connected in cascade, as shown in Fig. 3, and then in two sets of cascade arrangements, as shown in Fig. 4, and finally two of the motors are connected in parallel, as indicated in Fig. 5, while the remaining two motors are idle. This combination of motor connections is particularly adapted to meet the service requirements hereinbefore discussed.

Inasmuch as the circuit connections are relatively simple and are so illustrated as to be readily followed, it is not deemed necessary to trace each circuit by specifying all of the contact members and conductors which it includes, but, in lieu thereof, I shall merely designate the contact segments upon the controller 5 through which the several connections are completed. In this way, the description will not be encumbered with unnecessary and lengthy enumerations of elements which do not add to the understanding of the invention.

Assuming the apparatus and circuit connections to be as shown in Fig. 1 and the several rheostats R1, R2, R3 and R4 to be empty, the operation of the system is as follows: The controller 5 is first moved into its position $a$, thereby establishing circuits from the several conductors 6, 7 and 8 to the primary winding P1 of motor M1, through contact segments 11, 12 and 13; from the secondary winding S1 of the motor M1, through the respective contact segments 14, 16 and 18 to the primary winding P2 of motor M2; from the secondary winding S2 of the motor M2 to the primary winding P3 of the motor M3, through the respective conducting segments 20, 22 and 24; from the secondary winding S3 of the motor M3, through the respective contact segments 26, 28 and 30, to the primary winding P4 of the motor M4, and from the secondary winding S4 of the motor M4, through the respective contact segments 32, 33 and 34, to rheostat R4. Thus, the motors are connected in cascade arrangement and are adapted for the lowest speed and horse-power output, and for the highest torque conditions.

If the rheostat R4 is gradually filled with a suitable electrolyte, the motors are gradually and correspondingly accelerated until the rheostat is filled, when the resistance in the secondary winding S4 of the motor M4 is entirely eliminated. Under these conditions, the first or low-speed running condition is obtained. The motor connections are shown in Fig. 3.

In order to increase the operating speed of the motors, the electrolyte in the rheostat R4 is quickly discharged or the rheostat electrodes are withdrawn from the electrolyte, in order to open-circuit the secondary winding S4. Thereupon, the controller 5 may be moved into position $b$ to establish the second-speed motor connections. If desirable, other means may be employed for open-circuiting the secondary winding S4 or interrupting the supply of energy temporarily while the motor connections are rearranged.

Having moved the controller into position $b$, the circuits already described with respect to motor M1 and primary winding P2 of motor M2 are maintained, while the secondary winding S2 of motor M2 is connected to rheostat R2 through the respective contact segments 20, 22 and 24. At the same time, energy is supplied from the conductors 6, 7 and 8 to the primary winding P3 of the motor M3 through circuits which include the respective contact segments 21, 23 and 25, while the other connections of the secondary winding S3 of motor M3 and of both the primary winding P4 and secondary winding S4 of motor M4 are maintained as before described. Thus, two parallel sets of motors in cascade arrangement are obtained.

If electrolyte be admitted into the rheostats R2 and R4 and the resistance of the respective secondary windings S2 and S4 be eliminated, the several sets of cascade-connected motors will be brought up to a speed corresponding to the conditions in which the secondary resistance is eliminated. The motor connections are shown in Fig. 4. The motors then operate at their second or intermediate running speed, which is substantially double the first-speed condition, and the horse-power output of the motors is substantially twice that of the low-speed arrangement, while the torque developed is substantially the same.

The secondary circuits of the windings S2 and S4 may then be open-circuited by discharging the electrolyte in the respective rheostats R2 and R4, or by other suitable means, after which the controller 5 is moved into position $c$. By so doing, the connections to the primary winding P1 of motor M1 are maintained as already described, while the secondary winding S1 is connected to rheostat R1 through circuits including the respective contact segments 14, 16 and 18. Energy is also supplied to the primary winding P2 of motor M2 from conductors 6, 7 and 8 by establishing circuits which include contact segments 15, 17 and 19, the connections of the secondary winding S2 of the motor M2 to the rheostat R3 being as already set forth.

Upon the completion of the circuits just traced, the motors M1 and M2 are connected in parallel, while the motors M3 and M4 are disconnected from the circuit and remain idle. Electrolyte may now be admitted to gradually fill the rheostats R1 and R2, thus bringing the motors M1 and M2 up to full running speed with their secondary resistances eliminated from circuit. The motor connections are shown in Fig. 5 in full lines. Under these conditions, the speed is substantially double the intermediate speed, the torque of the motors is substantially halved, and the horse-power output is approximately the same as that of the intermediate-speed connections.

Only two motors M1 and M2 are employed in this high-speed operation for the reason that the total horse-power output may thus be maintained substantially equal to that of the four motors when connected for intermediate speed operation, while efficiently operating the motors M1 and M2 to their full capacity. Moreover, such an arrangement is particularly desirable because it meets the service requirements and permits of the use of a phase converter of minimum capacity which is loaded to its full rating during both intermediate and high-speed full-load operation.

It is possible to secure the desired motor horse-power output and converter full-load capacity by employing all of the motors for high-speed operation, but, under such conditions, the several motors M1, M2, M3 and M4 would only be loaded to half rating, which would result in a relatively lower power-factor than if they were operated at their full capacity.

Reference may now be had to Figs. 2, 6, 7 and 8 which illustrate the preferable form of my invention. The system shown in these figures comprises a supply conductor 1, a transformer 2, a phase converter 3, a plurality of conductors or train lines 6, 7 and 8, a plurality of motors $M^11$, and $M^12$, a plurality of switching devices marked "Pole Change-over #1," "Pole Change-over #2," and "Cascade Switch," a plurality of rheostats $R^11$ and $R^12$, a plurality of line switches 40, and 41, and a plurality of short-circuiting switches 42 and 43.

No description of the supply conductor 1, transformer 2, phase converter 3 and rheostats $R^11$ and $R^12$ will be given, as they are of like character to those set forth in connection with Fig. 1.

The motors $M^11$ and $M^12$ are of like construction, and the motor $M^11$ is provided with a primary winding $P^11$ having end connections $A1_8$, $B1_8$ and $C1_8$ and intermediate connections $A1_4$ and $B1_4$ and $C1_4$, while the secondary winding $S^11$ is provided with end connections $X1_8$, $Y1_8$ and $Z1_8$, and with intermediate connections $X1_4$, $Y1_4$ and $Z1_4$.

The motors $M^11$ and $M^12$ are provided with primary and secondary windings which are permanently connected in delta and are arranged for a particular number of poles, for instance, eight poles, while, if the supply circuit connections are made to the intermediate points of the windings, said windings are connected in parallel-star and adapted for half the number of poles or four poles.

Before further describing my invention, it should be understood that, by reason of the peculiar arrangement of motor windings, whereby different numbers of poles are produced, the full-load capacity or horse-power output of the motors is maintained substantially constant, the output of the motors, when connected for the different number of poles differing approximately only 15%. This relation of outputs or motor capacities is of special importance in meeting the service requirements with a phase converter of minimum size and capacity which shall be operated most efficiently.

The switching device marked "Pole Change-over #1" is provided with a plurality of sets 46 and 47 of stationary contact terminals and movable contact segments 48 to 63, inclusive, which are adapted to make coöperative engagement when the switching device occupies its respective positions marked "8 pole" and "4 pole."

The switching device marked "Pole Change-over #2" is similar in construction to the one just described and embodies a plurality of sets 66 and 67 of stationary contact terminals and coöperating movable contact segments 68 to 83, inclusive.

The switching device marked "Cascade Switch" is also of similar construction and comprises a plurality of sets 86 and 87 of stationary contact terminals and coöperating movable contact segments 88 to 96, inclusive. The "Cascade Switch" is adapted to occupy two positions marked "Off" and "On."

The "Pole Change-over #1" and "Pole Change-over #2" are, respectively, adapted to arrange the connections of the windings $P^11$ and $S^11$ of motor $M^11$ and the windings $P^12$, $S^12$ of motor $M^12$ for the different numbers of poles, namely, eight poles and four poles, as assumed, while the "Cascade Switch" has for its function to arrange the motor connections for connecting the motors either in parallel or in cascade arrangement.

Figure 6:
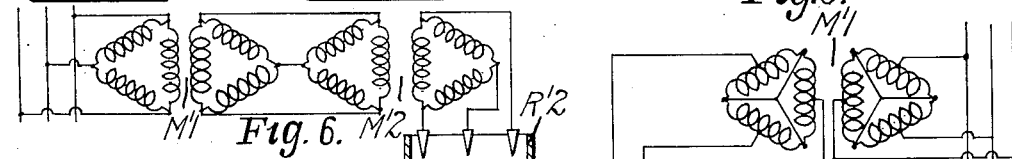
Figures 7, 8:
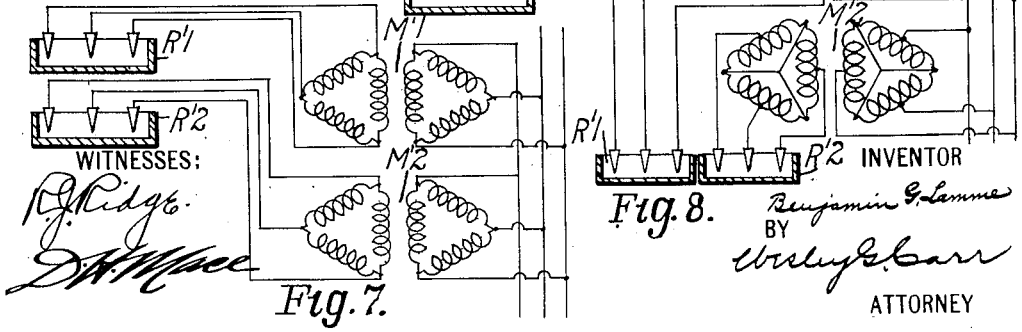

According to this preferred form of my invention, the motors are first connected in cascade with the larger number of poles, namely eight, as shown in Fig. 6, are then connected in parallel with the larger number of poles as shown in Fig. 7, and are subsequently connected in parallel with the smaller number of poles, namely, four, as shown in Fig. 8, whereby the desired operating speeds are secured.

Assuming the connections and various parts of the apparatus to be as shown, the operation of the system is as follows: The line switch 40 is first closed, thereby connecting the conductors 6, 7 and 8 to the respective connections $A1_8$, $B1_8$ and $C1_8$ of the motor $M^11$ through contact segments 48, 49 and 50 of "Pole Change-over #1," while the points $X1_8$, $Y1_8$ and $Z1_8$ of the secondary winding $S^11$ are respectively connected to points $X2_8$, $Y2_8$ and $Z2_8$ of the secondary winding $S^12$ of motor $M^12$ through a circuit including contact segment 56 of "Pole Change-over #1" and contact segment 88 of the "Cascade Switch," another circuit including contact segment 57 of the "Pole Change-over #1" and contact segment 89 of the "Cascade Switch," and another circuit through contact segment 58 of "Pole Change-over #1" and contact segment 90 of the "Cascade Switch." The primary winding $P^12$ of motor $M^12$ has its points $A2_8$, $B2_8$ and $C2_8$ connected to the rheostat $R^12$, respectively, through a circuit including contact segment 68 of "Pole Change-over #2" and contact segment 91 of the "Cascade Switch," another circuit including contact segment 69 of "Pole Change-over #2" and contact segment 92 of the "Cascade Switch," and another circuit including contact segment 70 of "Pole Change-over #2" and contact segment 93 of the "Cascade Switch."

Thus, the motors $M^11$ and $M^12$ are connected in cascade relation, with their primary and secondary windings arranged for eight poles, it being noted that motors $M^11$ and $M^12$ are connected secondary-to-secondary instead of secondary-to-primary, as is usually done. If electrolyte is admitted into rheostat $R^12$, the motors are gradually accelerated as the rheostat is filled, and the secondary resistance of the motor $M^12$ is eliminated. When the rheostat $R^12$ is filled with electrolyte, it may be short-circuited through the short-circuiting switch 43. The motors are thus brought up to their first running speed and are adapted to deliver their greatest torque and are connected for their smallest horse-power outputs. The motor connections are shown in Fig. 6.

The short-circuiting switch 43 will then be opened and the electrolyte will be discharged quickly from the rheostat $R^12$, after which the "Cascade Switch" will be moved to its "off" position to connect the several motors in parallel arrangement as follows: The primary winding $P^1 1$ of the motor $M^1 1$ is connected to the conductors 6, 7 and 8, in the manner already described, while the points $X1_8$, $Y1_8$ and $Z1_8$ of motor $M^1 1$ are connected to rheostat $R^1 1$ through circuits, respectively including contact segment 56, contact segment 57 and contact segment 58 of the "Pole Change-over #1".

The line switch 41 being closed, connections are established from conductors 6, 7 and 8 to points $A2_8$, $B2_8$ and $C2_8$ of the secondary winding $M^1 2$ through the respective contact segments 68, 69 and 70 of the "Pole Change-over #2", while points $X2_8$, $Y2_8$ and $Z2_8$ are, respectively, connected to rheostat $R^1 2$ through a circuit including contact segment 88 of the "Cascade Switch", contact segment 76 of "Pole Change-over #2" and contact segment 94 of the "Cascade Switch", another circuit through contact segment 89 of the "Cascade Switch", contact segment 77 of "Pole Change-over #2" and contact segment 95 of the "Cascade Switch", and another circuit including contact segment 90 of the "Cascade Switch", contact segment 78 of the "Pole Change-over #2" and contact segment 96 of the "Cascade Switch". The motors $M^1 1$ and $M^1 2$ are thus connected in parallel with their largest number of poles, as shown in Fig. 7.

The rheostats $R^1 1$ and $R^1 2$ are then filled with electrolyte gradually until the motors are brought up to their second or intermediate running speed when the rheostats are short-circuited respectively by short-circuiting switches 42 and 43.

Under these conditions, the operating speed and full-load capacities of the motors are substantially double those corresponding to the low-speed connections, while the torque thereof is maintained approximately the same.

In order to effect the high-speed connections, the short-circuiting switches 42 and 43 are opened and the electrolyte is discharged from the rheostats $R^1 1$ and $R^1 2$. Subsequently, the "Pole Change-over" switches are moved to their "four pole" position for reconnecting the windings of the motors for a smaller number of poles.

Having moved the "Pole Change-over" switches into their "four pole" positions, connections are established from the conductors 6, 7 and 8 to the intermediate points $A1_4$, $B1_4$ and $C1_4$ through the respective contact segments 51, 53 and 55 of "Pole Change-over #1", while the points $A1_8$, $B1_8$ and $C1_8$ are interconnected by means of contact segments 52 and 54. The intermediate points $X1_4$, $Y1_4$ and $Z1_4$ are connected to rheostat $R^1 1$ through circuits respectively including contact segment 59, contact segment 61 and contact segment 63 of the "Pole Change-over #1", while the points $X1_8$, $Y1_8$, and $Z1_8$ are interconnected through contact segments 60 and 62.

The windings $P^1 2$ and $S^1 2$ of motor $M^1 2$ are similarly connected through corresponding segments of "Pole Change-over #2", and, on account of the similarity of connections and the ease with which they may be traced, no detailed description thereof will be given.

In this manner both motors $M^1 1$ and $M^1 2$, with their smaller number of poles, are connected in parallel, and hence, said motors may be brought up to their high-speed operation by gradually filling the rheostats $R^1 1$ and $R^1 2$ with electrolyte, after which said rheostats may be short-circuited by the short-circuiting switches 42 and 43.

As already pointed out, the horse-power outputs of the motors under these conditions are substantially the same as when connected for their intermediate operating speed, while the torque developed is about halved. This arrangement of motor connections, therefore, fulfils the assumed service requirements and provides for efficient motor operation with a phase converter of minimum capacity and size. Moreover, the motors and the phase converter are operated at substantial full-load conditions during both the high speed connections.

It may be desirable under certain circumstances, to employ either two or three-phase motors having a plurality of separate windings adapted for different numbers of poles. For instance, the motors may be provided with separate windings arranged for six poles and four poles, and said motors may be interconnected either in cascade or in parallel to give twelve poles, ten poles, eight poles or four poles.

Although I have shown and described my invention as embodying apparatus of a more or less specific type of construction, and number of phases, and as involving particular circuit connections, it is evident that the broad principles of my invention may be utilized by means of apparatus and circuit connections differing materially from those set forth and I, therefore, desire that only such limitations shall be imposed as are indicated in the appended claims.

I claim as my invention:

1. In a control system, the combination with a plurality of induction motors severally provided with interconnected windings adapted to be connected in delta and in parallel star with different numbers of poles, of switching apparatus for successively cascading said motors with the windings connected in delta with the larger number of poles, for paralleling said motors with windings connected in delta with the same number of poles, and for paralleling said motors with windings connected in parallel star with the smaller number of poles.

2. In a control system, the combination with a plurality of induction motors severally provided with a single primary and a single secondary winding, of means for connecting the windings of each of said motors in delta and in parallel star, and means for connecting said motors in cascade and in parallel.

3. In a control system, the combination with a plurality of induction motors severally having windings permanently connected in delta, of means for connecting said motors in cascade, and for subsequently establishing connections to the mid-points of the several motor windings and connecting said motors in parallel.

4. The method of operating a plurality of induction motors severally provided with a single primary and a single secondary winding which consists in connecting said motors in cascade relation with the windings of each of the motors in delta relation, changing from cascade to parallel connection of the motors, and changing to parallel-star relation of the windings of each of the motors.

5. The combination with a pair of two-speed polyphase induction motors having primary and secondary windings, of a switching device for each motor adapted in one position to connect the windings thereof for one number of poles and in another position to connect the windings for half said number of poles, and another switching device adapted in one position to connect the secondary windings of said motors together for cascade operation with the larger number of poles and in another position to connect the windings of said motors for parallel operation with the smaller number of poles.

6. The method of operating a plurality of induction motors severally provided with interconnected windings which consists in cascading the motors with the windings connected in delta relation to provide a relatively large number of poles, paralleling the motors with the same internal connections, and paralleling the motors with windings connected in parallel-star to provide a relatively small number of poles.

7. The method of obtaining a geometrical-ratio series of speeds in connection with a plurality of induction motors severally provided with interconnected windings which consists in initially cascading the motors with the windings connected in delta relation to provide a predetermined number of poles, then paralleling the motors with the same internal connections, and finally paralleling the motors with windings connected in parallel-star to provide one-half of said predetermined number of poles.

In testimony whereof I have hereunto subscribed my name this 20th day of Feb., 1914.

BENJ. G. LAMME.

Witnesses:
E. LIVINGSTONE,
B. B. HINES.